Patented Dec. 6, 1949

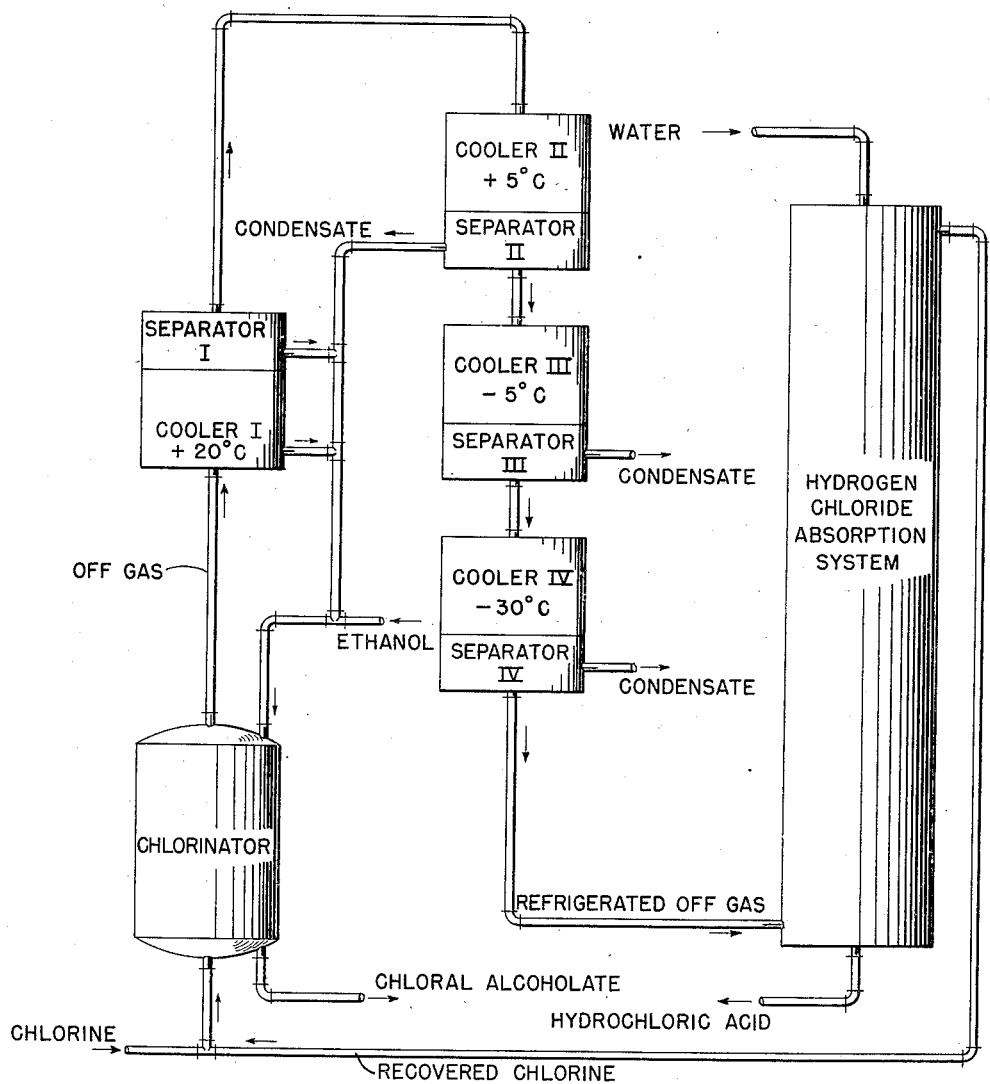

2,490,454

UNITED STATES PATENT OFFICE 2,490,454

PROCESS FOR THE RECOVERY OF HYDROGEN CHLORIDE FROM OFF-GAS

Lee A. Myers, Wilmington, Del., assignor to E. I. du Pont de Nemours & Company, Wilmington, Del., a corporation of Delaware Application June 20, 1946, Serial No. 678,071

2 Claims. (Cl. 23—154)

This invention relates to the chlorination of ethanol and is more particularly directed to processes in which the organic, hydrogen chloride, and chlorine constituents of the off-gases from ethanol chlorination operations are separated and recovered by cooling the off-gases in a series of stages, the cooling of each stage being sufficient to liquefy a fraction of the organic constituent of the off-gases but not enough to effect the solidification of a substantial amount of liquid, withdrawing the liquid formed in each stage, and passing the cooled off-gas into contact with water to absorb hydrogen chloride, leaving chlorine substantially undissolved.

In processes for the chlorination of ethanol, hydrogen chloride is formed as a by-product. The gaseous by-product, hydrogen chloride, in leaving the chlorination vessel carries with it smaller but substantial amounts of unreacted chlorine and organic vapors. This mixture of vapors, usually called the off-gas, is of relatively little value in its existing form although its constituents have themselves, in pure form, an appreciable value. Although this off-gas can be absorbed directly in water to recover at least some of the hydrogen chloride values, the hydrochloric acid formed is not sufficiently pure to be satisfactory for most commercial purposes.

It is an object of the present invention to provide processes whereby the organic, hydrogen chloride, and chlorine constituents of off-gases from the chlorination of ethanol may be separated and recovered. It is a further object to provide processes in which unreacted chlorine and the various organic compounds in the off-gas may be returned to the chlorination operation, thus to produce a cyclic procedure. It is a still further object to provide processes whereby a hydrogen chloride gas substantially free of organic contaminants may be produced using by-product gas from the chlorination of ethanol. It is a still further object to provide processes in which pure hydrochloric acid may be produced from the off-gases from the chlorination of ethanol. Still further objects will become apparent hereinafter.

The foregoing and other objects of the invention are attained by chlorinating ethanol, cooling the off-gases from the chlorination in a series of stages, the cooling in each stage being sufficient to liquefy a fraction of the organic constituent of the off-gas but not enough to effect the solidification of a substantial amount of the liquid, withdrawing the liquid formed in each stage and passing the cooled off-gas into contact with water thereby absorbing hydrogen chloride and leaving chlorine substantially undissolved.

In the drawing there is illustrated, by means of a flow sheet, a typical process of the invention. The invention will be more readily understood by reference to the drawing.

In the lower lefthand corner of the drawing is shown a chlorinator. It is here that the chlorination of ethanol is effected by passing chlorine into ethanol preferably in the presence of light. The off-gas from the reaction contains a large proportion of hydrogen chloride and contains, additionally, organic vapors, unreacted chlorine, and may contain inerts, such as nitrogen.

The ethanol used in the chlorination operation is usually 95 per cent alcohol, although absolute alcohol or alcohol containing a larger amount of water may be used. Using 95 per cent alcohol, chlorination is continued until a product consisting principally of chloral alcoholate with a smaller amount of chloral hydrate is obtained.

It will be observed that the drawing shows only one chlorinator. Of course, it will be apparent that any arrangement for effecting contact of chlorine with ethanol may be employed in the processes of my invention so long as the off-gases are treated as will be described hereinafter in more detail. For example, the chlorination vessels may be in multiple units and the off-gas from each may be combined or handled separately in subsequent processing. Alternatively, the system for contacting ethanol with chlorine may be made continuous by connecting two or more chlorinators in series with the ethanol flowing continuously from one to the other and with chlorine being fed either independently to each vessel, or concurrently, or countercurrently to the ethanol flow.

The off-gas from the chlorination step is passed thru a series of coolers and separators and is cooled to progressively lower temperatures in a number of stages. The cooling in each stage is so regulated and coordinated with the cooling in the other stages that there is obtained a fractional condensation of the organic vapors contained in the off-gas in each stage but so that no substantial amount of solidification of the condensed organic material occurs in any one of the stages.

There is associated with each cooler either as a part of the cooler design or as a separate unit following the cooler a means for separating condensed materials which are carried along as a mist in the gas leaving the cooler surfaces. This means, termed a separator in the drawing, is commonly known as an entrainment separator or trap. It is desirable that such an entrainment separator be employed following each cooler for otherwise the condensed organic liquids would tend to solidify in the following cooler.

The temperature differential between successive coolers may be varied somewhat with variations in the composition of the off-gas, the latter varying with the conditions existing in the chlorination stage, such as temperature of chlorination and degree of completion of the chlorination step. Thus the number of cooling stages employed and the degree of cooling attained in each stage may be varied depending upon conditions in the chlorination step, the purity desired in the effluent gas from the cooler system, and the desired composition of the organic condensate from each cooler. For example, I may employ more coolers than the number shown in the typical process illustrated in the drawing thereby decreasing the temperature differential between successive coolers and obtaining more selective fractions of organic condensate, or, conversely, by suffering some solidification of organic condensate, I may use fewer coolers. Similarly, I may cool the off-gas from the chlorination of ethanol to a lower final temperature than indicated in the drawing or I may employ less cooling depending upon the quantity and type of organic vapors in the off-gas and the quality desired in the refrigerated gas.

The design of the cooler units is not critical to the successful operation of the process so long as the coolers are constructed of materials which are resistant to the corrosive action of the off-gas and which will successfully withstand the reduced temperatures. For example, one may employ for this purpose, a standard type tube-and-sheet condenser in which the plurality of tubes carrying the off-gases are of Monel metal and are enclosed in a shell thru which cooling medium is passed. Similarly, the separator should be constructed of materials resistant to the corrosive action of the off-gas.

In the typical process illustrated in the drawing, the off-gases are preferably cooled to about 20° C. in cooler I. I have found this temperature to be ideally suited as the first stage in the process. In usual operation it is not feasible to cool much below this temperature, since cooling to temperatures appreciably below 20° C. frequently results in solidification of condensate and subsequent blockage in the cooler. I have found, however, that the temperature can be varied somewhat depending upon the conditions of the chlorination which, in turn, cause variations in the composition of the off-gas. For example, the off-gas varies in organic content with the temperature of chlorination and the degree of completion of the chlorination step. Thus under suitable conditions it may be possible to cool as low as 15° C. without any appreciable solidification and under particularly adverse conditions it may be necessary to raise the temperature slightly above 20° C. I have found, however, that by operating cooler I at about 20° C., satisfactory results are normally obtained and no difficulty with solidification in the cooler is experienced.

The organic materials condensing and forming a fluid mass in cooler I may, as shown in the drawing, be returned directly to the chlorination step. The cooled gases which normally carry along substantial amounts of condensate in the form of a mist are passed thru the separator which effects removal of the condensate as a fluid mass, and this separated material may also be returned to the chlorinator.

The effluent gases are then passed in indirect heat exchange with a cooling medium in cooler II and are preferably cooled to a temperature of about 5° C. Here again the temperature of 5° C. is not to be construed as a minimum, since under certain operating conditions it may be possible to operate at a somewhat lower temperature, say, down to 0° C. without appreciable solidification in the cooler and such minor variations in temperature of the cooler may be made by the operator as conditions may dictate. The liquid condensing in cooler II may then be passed into separator II, where a substantially complete separation of condensate and gas is made. The condensate is preferably returned to the chlorination step. This liquid, consisting in large measure of under-chlorinated products, is thereby recovered and returned to increase the yield of the chlorinated product.

Similarly, the effluent gas from cooler II is passed thru cooler III in which I have found it desirable to cool to about $-5°$ C. In cooler III, as with coolers I and II, the temperature shown has been found to provide excellent operating conditions under normal chlorination procedure without affecting the solidification of any substantial amount of condensate formed in the cooler. As in the case of the other coolers, however, it may be possible to operate satisfactorily at a slightly lower temperature without solidification as the conditions in the chlorination step are varied.

After effecting separation of the liquids condensed in cooler III, the exit gas is then passed thru cooler IV where it is cooled to a temperature of about 30° C. This cooling step, however, is not so limited as the previous cooling steps and one may cool as low as, say, $-70°$ C. without obtaining an appreciable amount of solidification in the cooler. However, I have found that such extreme cooling is not necessary to effect the removal of the major portion of organic constituents of the off-gas and that the off-gas resulting after cooling to $-30°$ C. is substantially free of organic chemicals and is suitable for further processing to absorb the hydrogen chloride in order to yield a pure hydrochloric acid, leaving unabsorbed the chlorine constituent.

The condensates which are separated following coolers III and IV contain various chlorinated by-products of the chlorination of ethanol and may be returned to the chlorination step or, as shown in the drawing, be withheld therefrom and processed as desired.

According to a process of my invention the off-gas from the chlorination of ethanol after having been cooled as heretofore described to separate the organic constituents may then be run into water in accordance with the customary practice to produce aqueous hydrochloric acid of whatever strength is desired. This treatment of the off-gas can be carried out in any of the various ways already well known in the art for absorbing hydrogen chloride gas. Thus packed towers may be used.

The problem of providing for dissipation of the heat of solution of hydrogen chloride in water in the absorption system is alleviated according to a preferred embodiment of my invention in which the refrigerated effluent gas from the final cooler is passed directly into the absorption system. Thus a saving is realized in the construction of the absorption system by the mitigation of the heat exchange problem thru the introduction of the cooled gas.

By absorption of the refrigerated hydrogen chloride-containing gas in water, I am able to obtain a high quality hydrochloric acid suitable for use in other commercial operations.

That portion of the gas not dissolved in water in the above step consists largely of chlorine gas which, of course, carries along with it an appreciable amount of water vapor. This chlorine gas may be returned directly to the chlorinator as shown in the drawing or if desired it may be first dehydrated by such means as cooling to condense the water vapor or passing in contact with drying agents or any other suitable manner for dehydrating. The recovered chlorine either with or without an intervening dehydration step may be returned to the chlorinator in combination with fresh chlorine or, alternatively, may be returned separately or used in other operations.

Following is an example of my invention, having particular reference to a specific run. The amounts are in parts by weight per minute unless otherwise stated.

Example

Ethanol is chlorinated in several units and the off-gas from these units is cooled to about 18° C. A substantial amount of condensation occurs in this cooling step and the fluid mass which results is returned directly to the chlorination units. The gases leaving the cooler contain condensed organic materials as a mist or in fine droplets which are separated from the gases by means of an entrainment trap and the condensate thus recovered is also returned to the chlorinators. The combined gases from the first cooling step are cooled in a second stage to about 3 to 6° C. and additional condensate is obtained, separated in an entrainment trap, and returned to the chlorinators. In a third step, the gases from the second cooling stage are further cooled to −5 to −6° C. and additional organic condensate is formed and separated. This condensate is not returned to the chlorinators, it being largely of a composition foreign to that desired in the ethanol chlorination product. In a final cooling step the gas from the previous cooling stage is reduced in temperature to −25 to −34° C. and additional condensate formed. This condensate is separated and withheld from the chlorinators for further processing. The refrigerated off-gas from the final cooling stage is passed into the base of a packed absorption tower and flows upward thru the tower countercurrent to water. There is obtained from the base of the tower a water-white hydrochloric acid. The gas taken overhead from the tower is principally chlorine and is returned to the chlorinators.

In a specific run the off-gas fed to the recovery system contained 402 parts of hydrogen chloride, 61 parts of chlorine, and an amount of organic impurities which was not accurately determined at this point. There was separated as liquid condensates in the entrainment traps a total of 58 parts of chlorinated organic material, 17 parts of the liquid condensate being separated in the first separator, 17 parts being recovered in the second separator, 8 parts in the third separator, and 16 parts in the last separator. In the hydrogen chloride absorption step, 750 parts of water were employed and there was obtained 1138 parts of approximately 34 per cent hydrochloric acid. The hydrochloric acid was of high purity, being water-white, and containing less than 0.004 per cent organic impurities determined as chloral hydrate. The undissolved gas obtained as an overhead from the hydrogen chloride absorption step contained 59 parts of chlorine.

In this example the slight discrepancy in the material balance between input and output of off-gas constituents is believed due to minor errors in analytical data.

I claim:

1. In a process for the recovery of hydrogen chloride from off-gas liberated in the chlorination of ethanol in a liquid phase to produce a chloral product, wherein said off-gas contains predominantly hydrogen chloride formed in said chlorination reaction and unreacted chlorine and relatively small amounts of organic vapors, the steps comprising cooling the off-gas in a series of stages, the cooling in each stage being only sufficient to liquefy a fraction of the organic vapors but not enough to effect solidification of a substantial amount of the liquefied vapors, separating the liquid formed in each cooling stage from the remaining gas before passing the gas into the succeeding cooling stage, the separation of organic materials by the series of cooling stages being substantially complete, passing the effluent gas from the final cooling stage into contact with water whereby an aqueous solution of hydrogen chloride is formed, and drawing off the gas which is not soluble in water.

2. In a process for the recovery of hydrogen chloride from off-gas liberated in the chlorination of ethanol in a liquid phase to produce a chloral product, wherein said off-gas contains predominantly hydrogen chloride formed in said chlorination reaction and unreacted chlorine and relatively small amounts of organic vapors, the steps comprising cooling the off-gas in at least four stages, the off-gas in the first stage being cooled to about 20° C., in the second stage to about 5° C., in the third stage to about −5° C., and in the fourth stage to about −30° C., separating the liquid formed in each cooling stage from the remaining gas before passing the gas into the succeeding cooling stage, the separation of organic materials by the series of cooling stages being substantially complete, passing the effluent gas from the final cooling stage into contact with water whereby an aqueous solution of hydrogen chloride is formed, and drawing off the gas which is not soluble in water.

LEE A. MYERS.

REFERENCES CITED

The following references are of record in the file of this patent:

UNITED STATES PATENTS

| Number | Name | Date |
|---|---|---|
| 477,375 | Lang | June 21, 1892 |
| 774,151 | Besson | Nov. 8, 1904 |
| 1,758,351 | Campbell | May 13, 1930 |
| 2,168,260 | Heisel | Aug. 1, 1939 |
| 2,263,623 | Gertler | Nov. 25, 1941 |
| 2,315,122 | Kraft | Mar. 30, 1943 |

OTHER REFERENCES

Hackh's Chemical Dictionary, third edition, pub. by the Blakiston Co., Philadelphia (1944), page 354.